Sept. 20, 1960  J. COLLINS ET AL  2,953,416
THRUST BEARING CONSTRUCTION
Filed Sept. 17, 1957

INVENTORS:
JEROME COLLINS,
HUGH MAC INNES, JR.,
WILTON E. PARKER,
By: Theodore E. Bieber
Attorney.

United States Patent Office 2,953,416
Patented Sept. 20, 1960

2,953,416

THRUST BEARING CONSTRUCTION

Jerome Collins, Palos Verdes Estates, Hugh MacInnes, Jr., Gardena, and Wilton E. Parker, Encino, Calif., assignors to The Garrett Corporation, Los Angeles, Calif., a corporation of California Filed Sept. 17, 1957, Ser. No. 684,530

2 Claims. (Cl. 308—161)

This invention relates generally to high speed rotating machinery and more particularly to turbomachinery or other fluid-operated apparatus having rotating elements operating within precisely limited clearance of housings or other parts.

As is well known in the manufacture of high speed rotating machinery, the parts comprising such machinery must be made to close tolerances so that when they are assembled no interference will occur between the stationary and moving parts. Frequently, if all the parts composing one unit conform to the required dimensions but each has the maximum or minimum allowable tolerance, the accumulation of the tolerances will cause an interference between the parts and the assembled unit will not operate. An object of this invention is to provide an end thrust limiting bearing which will have a minimum of parts so constructed and arranged that when the unit embodying the same is assembled the objections outlined above will be avoided.

Another object of this invention is to provide an end thrust bearing means which will maintain the longitudinal position of a rotating assembly within precise limits and yet will require a bare minimum of fine machine work on the parts comprising the apparatus.

A further object of the invention is to provide a thrust bearing assembly having inner and outer thrust plates formed for engagement with shoulder means on a housing to provide spaced opposed thrust bearing faces, the thrust bearing assembly also having a member formed for attachment to a shaft and having a portion to be disposed in the space between the bearing faces of the plates, the arrangement thus limiting longitudinal movement of the shaft yet offering a minimum of resistance to turning movement thereof.

A still further object of the invention is to provide a thrust bearing assembly of the type mentioned in the preceding paragraph, with seal means and passage means for conducting a lubricating medium to the relatively movable thrust faces whereby friction will be reduced and premature deterioration avoided.

Other objects and advantages of the present invention will be apparent from the following description and the accompanying drawing in which the invention has been illustrated in one preferred form.

Figure 1:
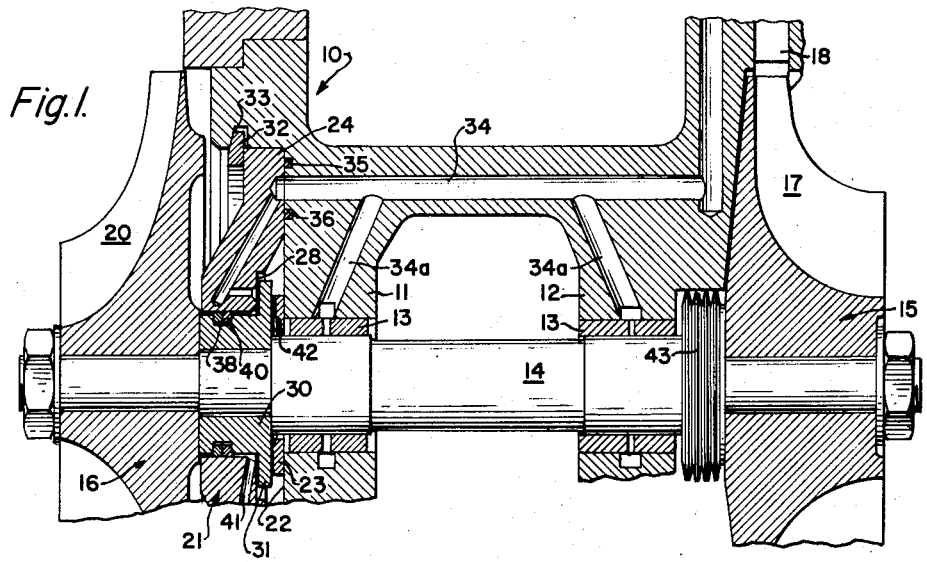
Fig. 1 is a longitudinal sectional view of a portion of a turbocompressor in which a thrust bearing assembly embodying the present invention has been incorporated.
Figure 2:
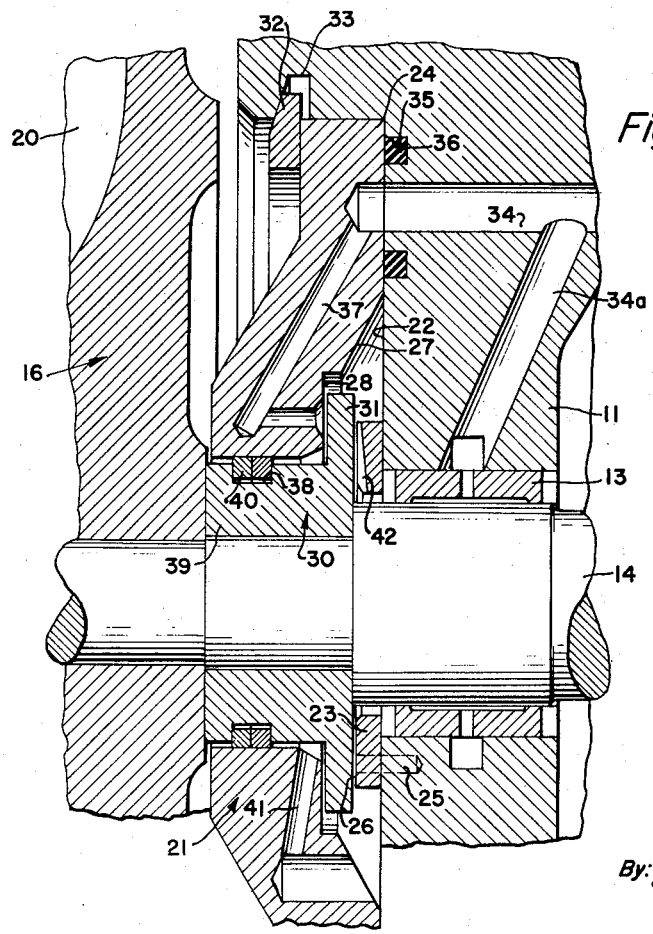
Fig. 2 is a fragmentary sectional view, on an enlarged scale, of a portion of the thrust bearing assembly.

Referring more particularly to the drawing, the numeral 10 indicates a portion of the housing of a turbocompressor to which the invention has been applied. This housing may be of any suitable construction, depending upon the use to which the turbocompressor is to be applied.

The housing includes a shaft opening which extends from one side of the housing to the other through wall portions 11 and 12 which are provided with journal bearings 13. These bearings receive for rotation a shaft 14, to opposite ends of which are applied a turbine wheel 15 and a compressor rotor 16, the former having vanes or blades 17 which are adapted to be engaged by fluid discharged from a nozzle 18 to effect the rotation of the wheel 15 and the shaft 14. This rotation is also imparted to the compressor rotor 16 to cause blades 20, provided thereon, to draw air from the atmosphere and discharge it into a passage, not shown, in the usual manner.

The turbocompressor, per se, forms no part of the present invention, the thrust bearing assembly merely being illustrated in connection with a turbocompressor for convenience.

The thrust bearing assembly may be used on any high speed rotating shaft. This assembly is provided particularly, as pointed out in the objects, to limit longitudinal movement of the shaft and prevent engagement of wheels or other devices carried by the shaft with stationary or other adjacent mechanism, such as parts of the housing 10. Also as pointed out in the objects, turbomachinery requires close clearance between relatively movable parts and the thrust bearing mechanism has been provided particularly for use with such mechanism.

As illustrated in Fig. 1, the wheel 15 and rotor 16 are disposed in close proximity to adjacent portions of the housing 10. The thrust bearing mechanism designated generally by the numeral 21 has been provided to hold the shaft 14 against such longitudinal movement as would permit the rotating elements to engage the housing. The latter is provided at one end of the opening for the shaft with shoulder means having a face portion 22 which may be finished during the manufacture of the housing, with a single working tool in a simple operation. The face portion of the shoulder is engaged by inner and outer bearing plates 23 and 24 respectively, the former being of smaller diameter than the latter and being suitably secured to the shoulder face portion as by a pin or other fastening device 25. Plate 23 provides a bearing surface 26 which faces outwardly or in the same direction as the face portion 22. Outer bearing plate 24 engages the face portion 22 around the inner plate 23, the central portion of the plate 24 being recessed as at 27 and provided with a bearing surface 28 facing in the direction opposite the bearing surface 26. Surface 28 is so disposed on the plate 24 that when the plate is engaged with the shoulder 22, surfaces 26 and 28 will be spaced from one another.

A third bearing member 30 in the form of a collar is secured for rotation with the shaft 14, the member 30 having an annular flange portion 31 which is disposed in the space between the surfaces 26 and 28. This flange portion has finished front and back thrust bearing surfaces which are parallel to and cooperate with the complemental surfaces 26 and 28. In the present instance, the thrust bearing faces are normal to the axis of rotation of shaft 14. The thickness of flange 31 conforms closely to the width of the space between the surfaces 26 and 28 so that the longitudinal movement of the shaft will be limited to a minimum. It will be obvious that the engagement of the flange portion 31 with either face 26 or 28 will limit the longitudinal movement of the shaft 14 in either direction.

The outer plate 24 is retained in engagement with the face portion 22 by a snap ring 32 which is disposed in a groove 33 formed in the housing 10. The outer surface of the snap ring and the complemental surface of groove 33 are inclined to cause the snap ring to constantly urge the outer plate 24 toward the face portion 22.

One of the features of the invention resides in providing means for lubricating the relatively movable surfaces of the thrust bearing assembly. To secure this object, the housing is provided with a passage 34, one end of which is open at the shoulder 22. The shoulder is formed with a groove 35 around the open end of the passage 34 to receive a sealing ring 36, this ring being engaged by the surface of the outer bearing plate. Snap ring 32 yieldably holds the bearing member in compressive engagement with the sealing ring 36 to prevent the escape of lubricating medium at this joint. Outer bearing member 24 is also provided with a passage 37 which registers and communicates with the open end of the passage 34, passage 37 extending from the shoulder engaging surface of the outer bearing member to the thrust face 28. It will be obvious that lubricating medium supplied under pressure to the passage 34 will flow through passage 37 to the thrust bearing face 28 and lubricate this face together with the complemental face of the flange portion 31. To preclude the flow of lubricating medium outwardly toward the compressor rotor, a portion 39 of the member 30 projects through or telescopes a portion of the outer plate 24 and is provided with an annular groove 38 to receive sealing rings 40, these rings engaging the inner surface of adjacent part of the outer bearing member. Excess lubricating medium may be drained from the interior of the outer bearing member through a drain passage 41 formed in the latter and extending to the interior of the housing 10. The inner plate 23 may also be provided with grooves 42 in the surface 26 so that lubricating medium around the shaft 14 may flow through these grooves and lubricate the engaging surfaces of the flange portion 31 and the inner bearing member. This lubricating medium is conducted to the shaft through branch passages 34a formed in the housing and extending to openings formed in the journal bearings 13.

A labyrinth type seal 43 is provided between the shaft 14 and the housing 10 adjacent the turbine wheel 15 to prevent the escape of lubricating medium at the turbine end of the shaft 14.

From the foregoing it will be obvious that a simple thrust bearing assembly has been provided which has a minimum of working parts, will require machine work to close tolerance at one end only of a housing or other device equipped therewith and may be readily lubricated and cooled without any additional equipment.

We claim:

1. In high speed rotating machinery, a housing having an opening for a shaft formed therein; annular shoulder means surrounding said opening at one end of said housing; bearing means supported by said housing in the opening; a shaft journalled in said bearing means; an inner thrust plate member secured to said annular shoulder means, said member providing a first thrust surface; a thrust member secured for rotation with said shaft, said rotating thrust member providing a second thrust surface in parallel running engagement with said first thrust surface and a third thrust surface facing in a substantially opposite direction; an outer thrust plate member engaging the annular shoulder means on said housing and providing a fourth thrust surface in parallel running engagement with said third thrust surface; retaining means yieldably urging said outer thrust plate member toward said annular shoulder means; said outer thrust plate member and said housing having lubrication passages in relative communication when said member is engaged with said annular shoulder means; and sealing means between said outer thrust plate member and said shoulder means around the point of communication of said lubrication passages, said thrust plate retaining means applying compressive force to said sealing means.

2. In high speed rotating machinery, a housing having an opening for a shaft formed therein; shoulder means surrounding said opening at one end of said housing; bearing means supported by said housing in the opening; a shaft journalled in said bearing means; a first annularly shaped thrust plate member secured to said shoulder means, said first thrust plate member providing a first thrust surface; a second generally annular shaped thrust plate member having a surface secured to the shoulder means on said housing, said second thrust plate member being of larger diameter than said first thrust plate member and providing a second thrust surface; a thrust member comprising a collar disposed within the inner periphery of said second thrust plate member and secured for rotation with said shaft, said rotating thrust member having an annular flange portion formed on said collar and disposed between said first and second thrust surfaces, said flange portion providing a third thrust surface and a fourth thrust surface in running engagement respectively with said first and second thrust surfaces; and seal means between said collar and said second thrust plate member.

References Cited in the file of this patent

UNITED STATES PATENTS

| | | |
|---|---|---|
| 1,476,345 | McGee | Dec. 4, 1923 |
| 1,690,425 | Norton | Nov. 6, 1928 |
| 2,877,945 | Trebilcock | Mar. 17, 1959 |